United States Patent
Marchal et al.

(10) Patent No.: US 11,635,554 B2
(45) Date of Patent: Apr. 25, 2023

(54) METHOD OF MANUFACTURING AN OPTICAL DEVICE AND RESULTING OPTICAL DEVICE

(71) Applicant: Morrow N.V., Ghent (BE)

(72) Inventors: Paul Marchal, Ghent (BE); Jelle De Smet, Aalst (BE); Wilbert Eduard Marie Lips, Ze Rijen (NL)

(73) Assignee: Morrow N.V., Ghent (BE)

( * ) Notice: Subject to any disclaimer, the term of this patent is extended or adjusted under 35 U.S.C. 154(b) by 283 days.

(21) Appl. No.: 16/771,890

(22) PCT Filed: Dec. 12, 2018

(86) PCT No.: PCT/EP2018/084531
§ 371 (c)(1),
(2) Date: Jun. 11, 2020

(87) PCT Pub. No.: WO2019/115606
PCT Pub. Date: Jun. 20, 2019

(65) Prior Publication Data
US 2021/0072438 A1    Mar. 11, 2021

(30) Foreign Application Priority Data
Dec. 12, 2017   (EP) .................... 17206753

(51) Int. Cl.
*G02B 5/18*   (2006.01)
*G02C 7/08*   (2006.01)
(Continued)

(52) U.S. Cl.
CPC ........... *G02B 5/1895* (2013.01); *G02C 7/083* (2013.01); *G02F 1/1339* (2013.01); *G02F 1/1341* (2013.01); *G02C 2202/20* (2013.01)

(58) Field of Classification Search
None
See application file for complete search history.

(56) References Cited

U.S. PATENT DOCUMENTS 7,728,949 B2    6/2010  Clarke et al.
2009/0109376 A1*  4/2009  Suemasu ........... G02F 1/133632
                                                        349/96
(Continued)

FOREIGN PATENT DOCUMENTS

EP    1428063 B1   6/2010
EP    2431790 A1   3/2012
(Continued)

OTHER PUBLICATIONS

Liu, Yan Jun, et al.; Nanoimprinted ultrafine line and space nano-gratings for liquid crystal alignment; IOP Publishing Ltd, Nanotechnology 23 465302; published Oct. 23, 2012.
(Continued)

*Primary Examiner* — Ryan Crockett
(74) *Attorney, Agent, or Firm* — McDonnell Boehnen Hulbert & Berghoff LLP

(57) ABSTRACT

An optical device (1), comprising: —a first optical transparent thermoplastic layer (2); —a second optical transparent thermoplastic layer (3), and; in between both thermoplastic layers (2, 3); • a diffractive optical element (4) adjacent to the first thermoplastic layer (2), • a spacer (5) in between the diffractive optical element (4) and the second thermoplastic layer (3), and; • a border (6) enclosing the diffractive optical element (4) thereby forming a sealed cavity (7); wherein at least an upper part of the border (6), adjacent to the cavity (7) is formed from an adhesive (15).

22 Claims, 15 Drawing Sheets

(51) Int. Cl.
   *G02F 1/1339* (2006.01)
   *G02F 1/1341* (2006.01)

(56) References Cited

U.S. PATENT DOCUMENTS

| | | | | |
|---|---|---|---|---|
| 2009/0256977 | A1* | 10/2009 | Haddock | G02C 7/022 156/60 |
| 2013/0037202 | A1* | 2/2013 | Ando | G02F 1/1341 156/99 |
| 2013/0128334 | A1* | 5/2013 | Stephen | G02B 21/14 359/279 |
| 2017/0357141 | A1* | 12/2017 | De Smet | G02F 1/29 |
| 2021/0072438 | A1* | 3/2021 | Marchal | G02F 1/1341 |

FOREIGN PATENT DOCUMENTS

| | | |
|---|---|---|
| EP | 2530511 A1 | 12/2012 |
| EP | 3255479 A1 | 12/2017 |
| JP | 52-28296 A | 3/1977 |
| JP | 2005-353207 A | 12/2005 |
| JP | 2009-15995 A | 1/2009 |

OTHER PUBLICATIONS

Lin, Rongsheng and Rogers, John A.; Molecular-Scale Soft Imprint Lithography for Alignment Layers in Liquid Crystal Devices; Nano Letters 2007, vol. 7, No. 6, pp. 1613-1621; published on Web May 23, 2007.

Kooy, Nazrin, et al.; A review of roll-to-roll nanoimprint lithography; Nanoscale Research Letters at vol. 9, No. 1, p. 320 (13 total pages), Jun. 25, 2014.

Clark, Noel, et al.; Alignment of liquid crystals by typographically patterned polymer films prepared by nanoimprint lithography, Applied Physics Letters, Apr. 18, 2007, pp. 163510-163510-3; retrieved from the Internet: URL: https:aip.scitation.org/doi/pdf/10.1063/1.2724912.

International Searching Authority of World Intellectual Property Organization; Written Opinion of the International Searching Authority for international application No. PCT/EP2018/084531 dated Feb. 19, 2019.

International Searching Authority of World Intellectual Property Organization; International Search Report for international application No. PCT/EP2018/084531 dated Feb. 19, 2019.

\* cited by examiner

METHOD OF MANUFACTURING AN OPTICAL DEVICE AND RESULTING OPTICAL DEVICE

FIELD OF THE INVENTION

The present disclosure relates to curved optical devices, in particular to curved optical devices comprising a liquid.

BACKGROUND OF THE INVENTION

Presbyopia is a well-known disorder in which the eye loses its ability to focus at close distance, affecting more than 2 billion patients worldwide. Classic solutions include passive lenses such as reading glasses, progressive lenses or multifocal contact lenses. However, these passive lenses typically suffer from limited field-of-view, reduced contrast or long adaptation times.

Therefore, refocusable lenses, where the focal length of, a part of, the lens can be changed have attracted much attention in this field, as they would eliminate many of the known problems. Although some opto-mechanical solutions exist, electro-optical solutions are preferred as they are easier to reconfigure, have a faster response time and are mechanically more robust. Most electro-optical solutions require a cavity filled with one or more liquids and are generally using a liquid crystal based implementation. While Liquid Crystal Display technology is very mature, finding a way to integrate a refocusable liquid crystal lens in ophthalmic lenses has proven to be difficult, mainly because of the meniscus shape ophthalmic lenses generally have.

For instance, existing, refocusable liquid crystal lenses are described in U.S. Pat. No. 7,728,949. This patent discloses lenses consisting of two plastic lens halves: a first curved lens half with a diffractive/refractive optical structure and a second lens half. On both lens halves transparent electrodes are deposited. The lens halves are glued together across the entire surface, except for the area of the optical structure, with a UV curable adhesive. At the location of the optical structure a liquid crystalline material fills the gap between both lens halves. In the off-state the liquid crystal has the same index of refraction as the plastic substrate of the lens halves. It then conceals the diffractive/refractive structure and there is no lens action. By applying an electrical field between the lens halves, the index of refraction of the liquid crystalline material is modulated and it becomes different from the underlying diffractive/refractive optical structure, thereby leading to lens action.

The above approach, where the liquid crystal lens is directly made on two relatively thick (>1 mm) lens halves has a series of disadvantages. It is very difficult to manufacture in large volume because a conformal deposition of the electrode layer onto the curved surface of the diffractive/refractive optical structure is difficult to realize and may lead to yield reliability issues. Obtaining a cost-effective and esthetically clean seal using a state-of-the art one-drop fill process is difficult to realize in ultra-thin lenses hence impeding high volume production of this approach. The diffractive/refractive optical structure can have a flat surface, but this limits the maximum diameter in typical thin lens designs where the flat lens needs to be somehow integrated between the curved back and front surfaces. The diffractive/refractive optical structure can be curved, but then the liquid crystal may spill over during the process, leading to contamination of the surfaces and bad adhesion of the glue. Filling the cavity post adhesion is another option but may leave the channel, through which the lens is filled, visible and compromises the aesthetics of the lens. One has to manufacture each lens blank separately, limiting the throughput. Since a polarization independent focal length change is generally required, one either needs to use a multi-layered lens structure with nematic liquid crystals, e.g. two layers with orthogonal alignment for both polarizations, or use a single layer combined with a cholesteric liquid crystal. The approach makes it really hard to create a multi-layer lens structure, forcing the use cholesteric liquid crystal to build a polarization independent lens with only one layer. However, it is known for people skilled in the state of the art that it is very difficult to control the haziness of the cholesteric layers, particularly thick layers, due to disclination lines and the large internal energy of the cholesteric layers. To avoid haziness of the cholesteric liquid crystals, one has to reduce the thickness of the liquid crystal layer, but this limits the blaze height forcing the use of a shorter pitch of the blazes in the optical diffractive/refractive structure, thereby increasing chromatic aberrations. As said, multi-layer lenses using nematic liquid crystals may result in a polarization independent lens with less haze, but the proposed approach will lead to lenses with a large thickness and many handling issues.

Another approach to address the above challenges may be to form a thin film liquid crystal layer first on a flat surface and then embed this flat surface it into passive lenses. An attempt hereto is disclosed in EP 1,428,063B1, describing a method for building electro-chromic lens inserts based on liquid crystal. The approach described is to manufacture first a liquid crystal device on a flat substrate. The device consists of two opposite facing substrates, on which transparent conductors are deposited, spaced from another using classical ball spacers or spherical polymer particles. The spacing is filled with a liquid crystal layer and sealed thereafter. The flat device is then thermoformed for integration in lens blanks. The described device does not have any lens action, i.e. it can be used to change the transparency of the lens, not the optical power.

A further prior art refocusable liquid crystal lens is known from EP2530511A1. The said lens is produced in a series of steps comprising (1) providing a diffractive element such as a Fresnel lens on a first substrate, (2) applying a barrier layer, an electrode layer and an alignment layer on the Fresnel lens (3) dispensing photosensitive resin material (3) including spacers laterally around the diffractive element to define a border; (3) dispensing liquid crystal material onto the diffractive element at an inside of said border; (4) providing a second substrate overlying said border, such that the liquid crystal material fills a thus created cavity, (5) protecting the cavity by applying adhesive material laterally around the cavity between the first and the second substrate, (6) sealing the cavity by applying UV radiation to cure the adhesive and the photosetting resin of the border and (7) edging the resulting blank lens to generate a curved lens. An imprint process using a mold may be applied to provide the diffractive element onto the substrate.

The shown production method tends to have various disadvantages. A first disadvantage is that the spacer is based on particles having a predefined particle size (10.5 microns, as stated in paragraph [0111]. However, there is always a tolerance in the particle size and it is not clear that such particles would extend from the first to the second substrate. Furthermore, spherical spacer particles will create interfaces that could be visible in the end product. A further disadvantage of the said method is its mechanically cutting out, particularly by grinding and polishing of the desired lens shape in the edging step. The issue therewith is not merely the required work, but particularly the cutting through different layers. One reason giving for the provision of adhesive material around the cavity is to provide stability. However, the provision of this adhesive can only be done on an individual level, i.e. from a side.

Again a further refocusable liquid crystal lens is described in EP3255479A1, which was published after the priority date of the present application. The described method makes use of thermoforming rather than mechanical cutting. However, the method includes the risk of bubble inclusion.

SUMMARY OF THE INVENTION

Hence there is a need for a curved optical device with electrically tunable phase profile, e.g. a focal length change, whereby this device can be mass manufactured in a reliable way.

In a first aspect a method is disclosed for manufacturing an optical device that comprises a pair of a first and second optically transparent electrode layers at opposite sides of a cavity filled with liquid crystalline material. The cavity is laterally enclosed by a border. The first and second optically transparent electrode are respectively present on a first and a second optically transparent thermoplastic layer. The first optically transparent electrode is positioned in between the first optically transparent thermoplastic layer and a diffractive optical element. The at least one spacer is present between the diffractive optical element and the second optically transparent thermoplastic layer . . . .

Such a method of manufacturing this optical device, comprises: providing a first optical transparent thermoplastic layer; forming by nanoimprint on the first optical transparent thermoplastic layer, at least one of the spacer, the optical diffractive element and a optionally a part of the border enclosing the optical diffractive element and the spacer; applying an adhesive so as to constitute part of the border and in direct contact with the cavity; providing a second optical transparent thermoplastic layer so as to close the cavity, wherein the second optically transparent thermoplastic layer on which the second optically transparent electrode layer is formed, is attached to the adhesive (15); filling the cavity with liquid crystalline material, and sealing the cavity.

According to the invention, one or more localized spacers, being arranged between the diffractive element and the second thermoplastic layer, and thus within the cavity, stabilize the cavity. It is the insight of the inventors, that such stabilization allows the creation of at least an upper part of the border from adhesive, without variations in the distance between the two thermoplastic layers over the surface area of the optical device (i.e. the area with the optical function). The stabilization is at least sufficient for the time until the curing of the adhesive and therewith sealing of the device.

When nanoimprinting the spacer, the optical diffractive element and the part of the border enclosing the optical diffractive element, the spacer can be made in form of a pillar, a wall, a truncated cone. The dimensions thereof are defined in the mold used for the nanoimprinting and thus fixed and reproducible. Furthermore, the rather block-shaped structures reduce the risk of optical errors due to a spherical spacer interface.

In this process, a notch can be formed forming in the border, remote from the cavity. This notch is configured to contain an adhesive in contact with the second thermoplastic layer, which adhesive is provided in the notch only before the second optical transparent thermoplastic layer, is applied. However, such notch is not deemed essential.

A liquid crystalline material can be provided over the optical diffractive element, the amount thereof is selected to fill only the sealed cavity when the second optical transparent thermoplastic layer is provided. This liquid crystalline material can be provided to the cavity before the second optical transparent thermoplastic layer closes the cavity. Alternatively this liquid crystalline material can be provided to the closed cavity via a channel, formed at least in the upper part of the border, extending through the border into the cavity. This channel is preferably formed when nanoimprinting the border.

In one embodiment, the spacer, the optical diffractive element and the border enclosing the optical diffractive element are formed of the same material stack. Thereto a layer of a material composition is formed on the first optical transparent layer, and, in this layer the spacer, the optical diffractive element and the border enclosing the optical diffractive element are nanoimprinted, whereby the spacer and the optical diffractive element are stacked on each other thereby maintaining a controlled distance between both thermoplastic layers. During this nanoimprint step submicron grooves can be formed in the surface of the optical diffractive element facing the second thermoplastic layer, the submicron grooves being configured as an alignment layer for a liquid crystalline material. Optionally a conformal alignment layer (not shown in the figures) can be deposited covering at least part of the grooves.

In another embodiment, the step of nanoimprinting comprises the two subsequent stages, each comprising the application of a layer of a material composition and the nanoimprinting of a pattern therein by means of a mold. In the first stage, the diffractive optical element and part of the border adjacent to the diffractive optical element are defined. In the second stage, further features are defined such as spacers on top of the diffractive elements and any additional spacers on top of a bottom part of the border.

Preferably, the second step comprises the provision of a layer of planarizing material thereby covering the diffractive optical element and at least part of the border adjacent to the diffractive optical element. In this planarizing layer the spacer and part of the border are nanoimprinted, whereby the spacer, the planarizing layer and the diffractive element are stacked on each other thereby maintaining a controlled distance between both thermoplastic layers. During this nanoimprint, submicron grooves can be formed in the surface of the planarizing layer facing the second thermoplastic layer, the submicron grooves being configured as an alignment layer for a liquid crystalline material. Additionally, a conformal alignment layer can be formed covering at least part of the grooves.

Preferably, the planarizing layer is nanoimprinted so as to create a planar bottom of the cavity, overlying the diffractive optical element. Herein, the dielectric constant of the planarizing layer will be different from that of the diffractive optical element. However, refractive indices of said element and said layer will be the same, so as to ensure transparence in the off-state of the optical device. The difference in dielectric constant leads to a non-uniform electric field over the cavity, which is desired to ensure that the orientation of the molecules of the liquid crystalline material is dependent on their location (i.e. in lateral directions).

It is deemed advantageous to apply the adhesive material by means of a printing process, such as screen printing. Alternative methods are not excluded. It is deemed beneficial to apply adhesive material on top of a bottom part of the border that has been provided in the nanoimprint step. In this manner, the drop size of the printing process of the adhesive is decoupled from the distance between the first and the second substrate. Moreover, the printing of adhesive on a polymeric substrate (such as the border) turned out to provide good wetting.

In a further embodiment, additional spacers are present in the border, which are created in the nanoimprint step. These additional spacers facilitate to maintain a predefined distance between the first and the second thermoplastic layer. Such additional spacers may further stabilize the adhesive during the manufacturing process.

The method can further comprise forming a first optical transparent electrode onto the first optical transparent thermoplastic layer and forming a second optical transparent electrode adjacent to the second optical transparent thermoplastic layer. Rather than forming the electrodes, the thermoplastic layers may be provided with said electrode layers having been applied thereon in advance.

In one advantageous embodiment, the method includes forming by nanoimprint an array of: a spacer and an optical diffractive element, both enclosed by a border. Subsequently, the second thermoplastic layer may be applied, in a manner so as to close all cavities in the array. Singulation of the array of formed optical devices into individual optical devices occurs only later, before or after optional stacking of devices and thermoforming. The optical device can then be thermoformed, thereby giving each optical transparent thermoplastic layer a predetermined curvature.

A stack of two such optical devices can be formed applying the methods discussed in this aspect of the invention. In one implementation the stack is obtained by manufacturing an array of optical devices and stacking two singulated optical devices. Optionally this stack of two optical devices is thermoformed, thereby given each optical transparent thermoplastic layer a predetermined curvature. In an alternative implementation, the process sequence can be repeated as many times as the number of optical devices to be included in the stack. The method of manufacturing then comprises manufacturing a first optical device, then manufacturing on the first optical device a second optical device, whereby the second optical transparent thermoplastic layer of the first optical device serves as the first optical transparent thermoplastic layer of the second optical device. If an array is formed, this array is singulated to yield the stack of two optical devices. This stack of two optical devices can then be thermoformed thereby given each optical transparent thermoplastic layer a predetermined curvature.

In a second aspect an optical device is disclosed comprising a pair of a first and second optically transparent electrode layers at opposite sides of a sealed cavity filled with liquid crystalline material, said cavity being laterally enclosed by a border, wherein said first and second optically transparent electrode are respectively present on a first and a second optically transparent thermoplastic layer, which first optically transparent electrode is positioned in between the first optically transparent thermoplastic layer and a diffractive optical element, wherein at least one spacer is present between the diffractive optical element and the second optically transparent thermoplastic layer. Herein, said diffractive element, the at least one spacer and a bottom part of said border are present in a layer that is patterned by nanoimprinting and is present on the first optically transparent thermoplastic layer. An upper part of said border comprises an adhesive that is in direct contact with the cavity, wherein the second optically transparent thermoplastic layer closes the cavity, and wherein the second optically transparent thermoplastic layer on which the second optically transparent electrode layer is formed, is attached to the adhesive.

The optical device thus contains a sealed cavity formed by a first thermoplastic layer and a second thermoplastic layer and a border in between both thermoplastic layers. In area enclosed by the border a diffractive optical element and a spacer are present. Since the diffractive optical element, the spacer and the border are of the same material composition, these components can be formed by nanoimprint in the same layer stack.

The border is at least partially, the upper part, formed from an adhesive. Providing an adhesive to form at least a part of the border provides manufacturing advantages. The cavity of such an optical device is filled with a liquid crystalline material. In some embodiments, a channel is present extending through the border into the cavity, which channel allows filling the cavity with the liquid crystalline material. Such channel is closed off after filling the cavity, for instance by means of capillary filling the channel with an adhesive, followed by a curing step.

Preferably, the entire side of border, adjacent to the cavity is formed from an adhesive. Alternatively, only the upper part of the border, adjacent to the cavity is formed from an adhesive. According to the invention, the diffractive optical element, the spacer and the bottom part of the border have the same material composition. Further preferably, the bottom part of the border comprises additional spacers. This allows the bottom part of the border, the spacer, the additional spacers and the diffractive element to be manufactured in a single process step and/or from a single material. This significantly simplifies the manufacturing complexity and thereby enhances the reliability of the optical device.

According to the invention, the spacer and the diffractive optical element are stacked on each other, such that this stack maintains a controlled distance between both thermoplastic layers. To improve the alignment of a liquid crystalline material when present, the surface of the diffractive optical element, facing the second thermoplastic layer, preferably contains submicron grooves configured as an alignment layer for a liquid crystalline material. Additionally, an conformal alignment layer can be present covering at least part of the grooves.

In another embodiment, a layer of a planarizing material can be present, covering the diffractive optical element and whereby at least part of the border adjacent to the diffractive optical element is made of the planarizing material. Now the spacer, the planarizing layer and the diffractive optical element are stacked on each other, whereby this stack maintains a controlled distance between both thermoplastic layers. To improve the alignment of a liquid crystalline material when present, the surface of that part of the planarizing layer covering the diffractive optical element, facing the second thermoplastic layer, contains submicron grooves configured as an alignment layer for a liquid crystalline material. Additionally, an conformal alignment layer can be present covering at least part of the grooves. The border can comprise, remote from the cavity, a notch now formed in the planarizing material, whereby the notch contains an adhesive in contact with the second thermoplastic layer.

The optical device further comprises a first optical transparent electrode adjacent to, i.e. on the first optical transparent thermoplastic layer, a second optical transparent electrode adjacent to, i.e. on the second optical transparent thermoplastic layer, whereby at least the cavity is in between both optical transparent electrodes such that, when in use, an electrical field is applied at least over the liquid crystalline material when present in the cavity. The first transparent electrode can be positioned in-between the diffractive optical element and the first optical transparent thermoplastic layer, whereby the diffractive optical element and the cavity are in between both electrodes). Alternatively, the first transparent electrode is on the surface of the diffractive optical element facing the other optical transparent thermoplastic layer.

Furthermore, the optical device can be curved, i.e. both optical transparent thermoplastic layers have a predetermined curvature.

In a third aspect an optical instrument is disclosed comprising at least an optical device according to the first aspect. The optical device is configured to, when in use, tune the phase profile of the light towards the eye. An example of such an optical instrument is a lens. The optical instrument can contain more than on optical device according to the first aspect, e.g. a stack of two of such optical devices.

BRIEF INTRODUCTION OF THE FIGURES

For a better understanding of the present disclosure, some exemplary embodiments are described below in conjunction with the appended figures and figures description, wherein.

FIG. 7(a) to (d) illustrates various embodiments of a method of manufacturing an optical device.

FIG. 8(a) to (e) illustrates a preferred embodiment of a method of manufacturing an optical device.

FIG. 9(a) to (b) illustrated an embodiment of a method of manufacturing an optical device: (a) side view, (b) horizontal cross section A-A.

Figure 9:
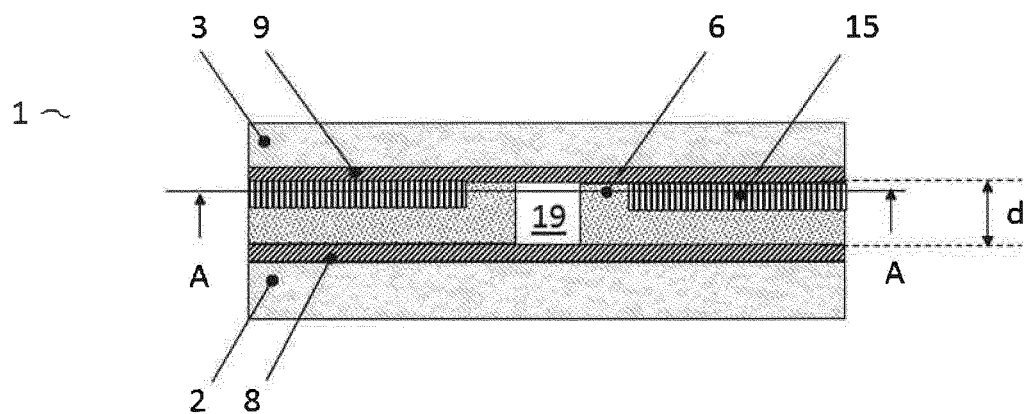
Figure 9:
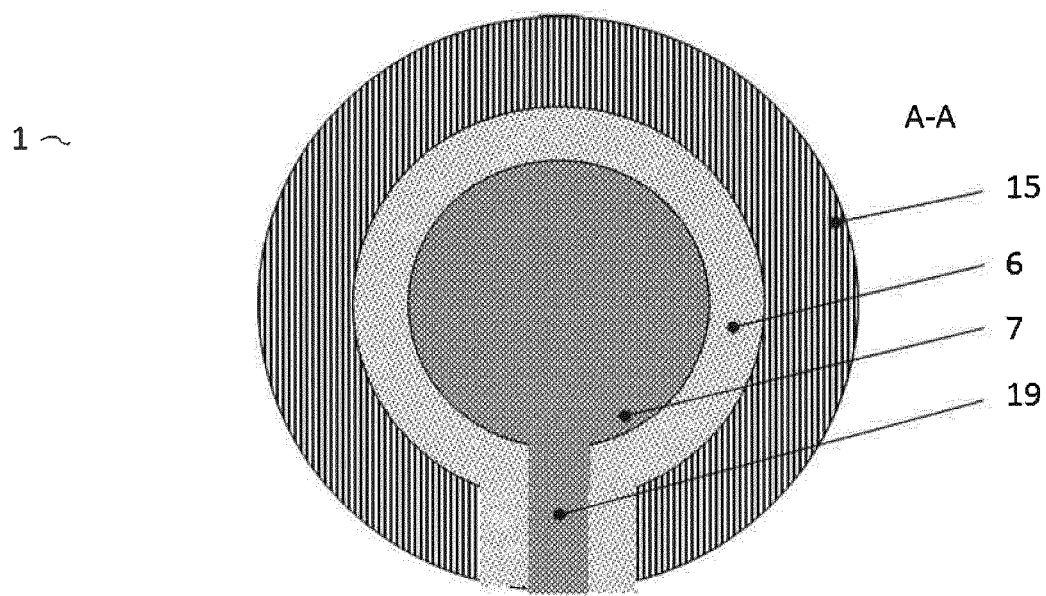
Figure 9C:
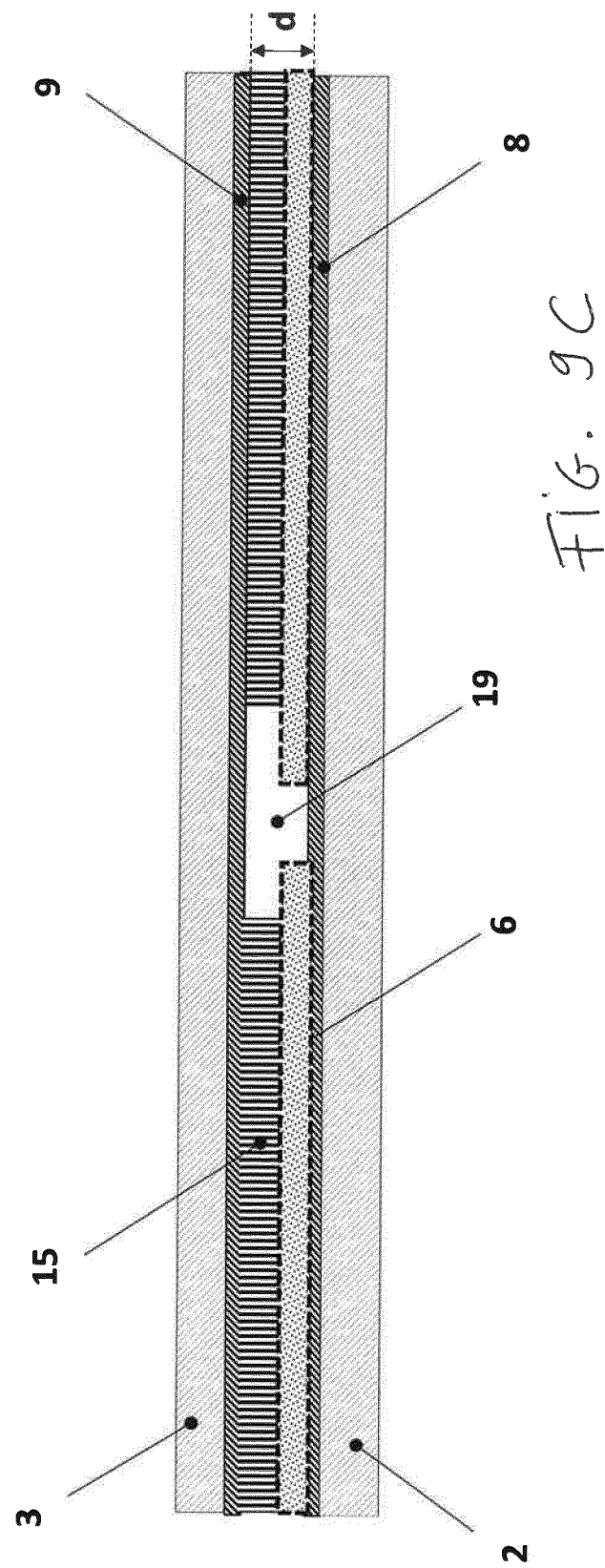
Figure 10:
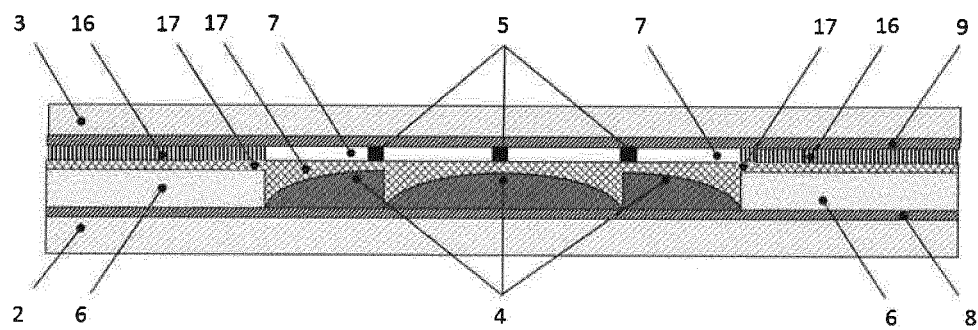

FIG. 9C illustrates a further embodiment similar to FIG. 9A;

FIG. 10 illustrates an optical device with planarizing layer prior to thermoforming according to an embodiment.

Figure 2:
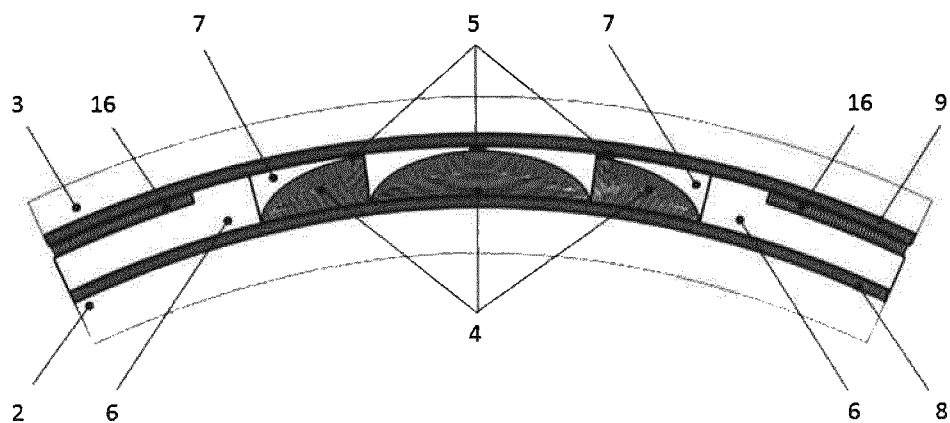
FIG. 2 illustrates the optical device of FIG. 1A after thermoforming according to an embodiment.
Figure 11:
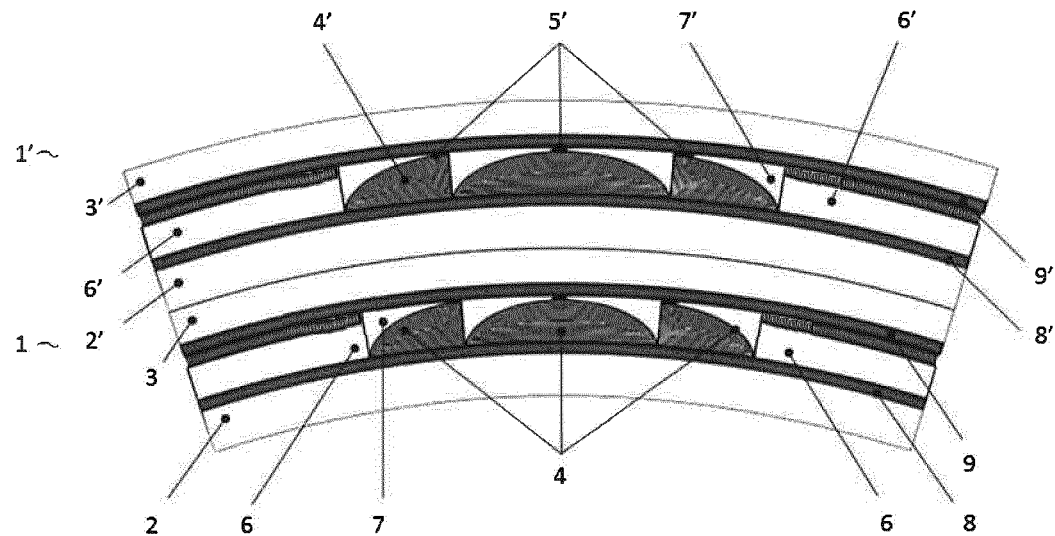

FIG. 11 illustrates an optical instrument containing a stack of optical devices of FIG. 2 according to an embodiment.

Figure 4:
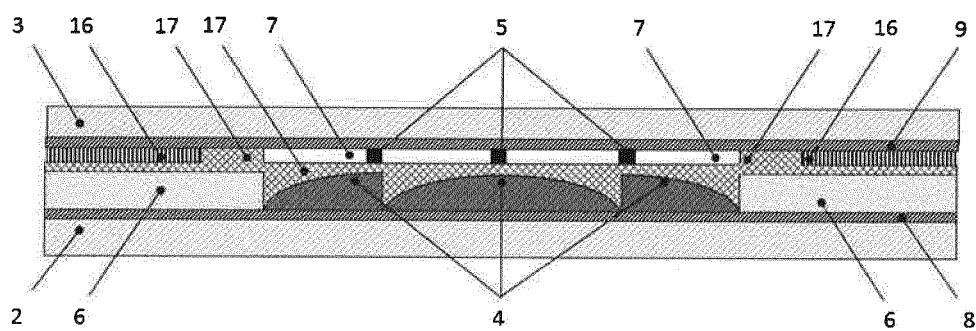
FIG. 4 illustrates an optical device with planarizing layer prior to thermoforming according to an embodiment.
Figure 12:
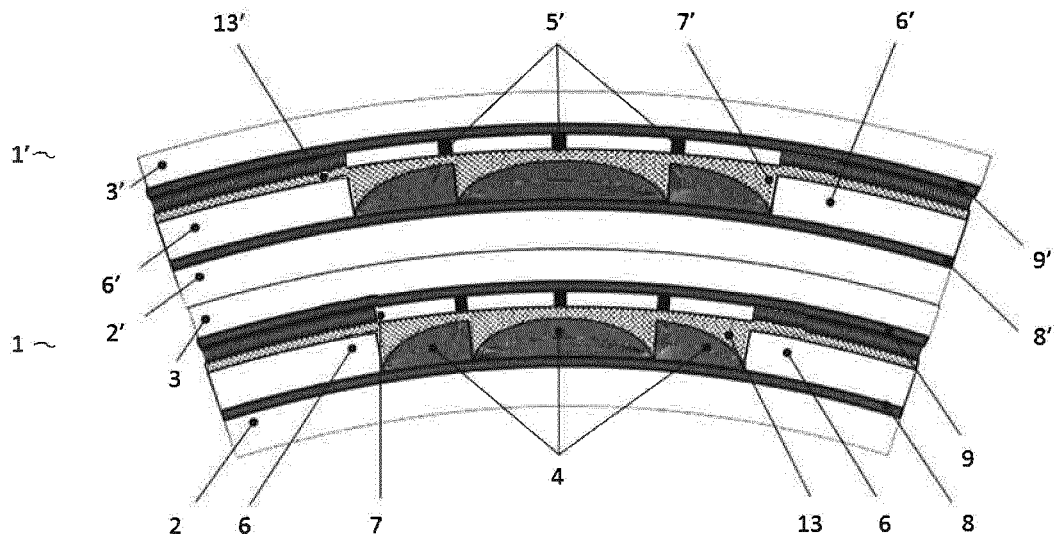
Figure 13A:
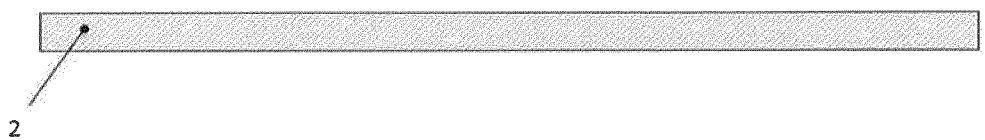
Figure 13B:
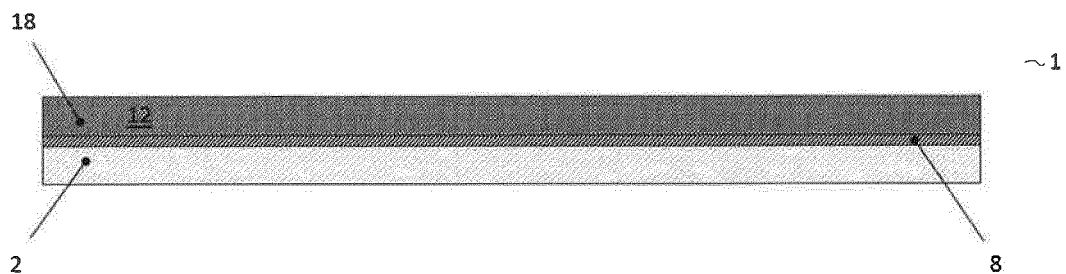
Figure 13C:
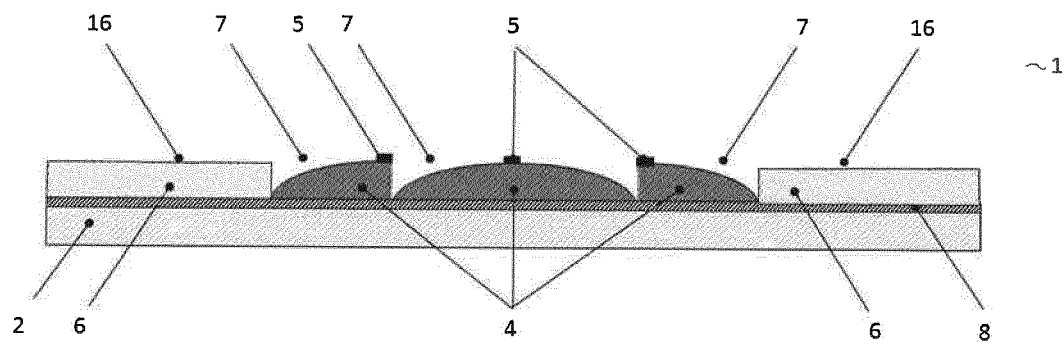
Figure 13D:
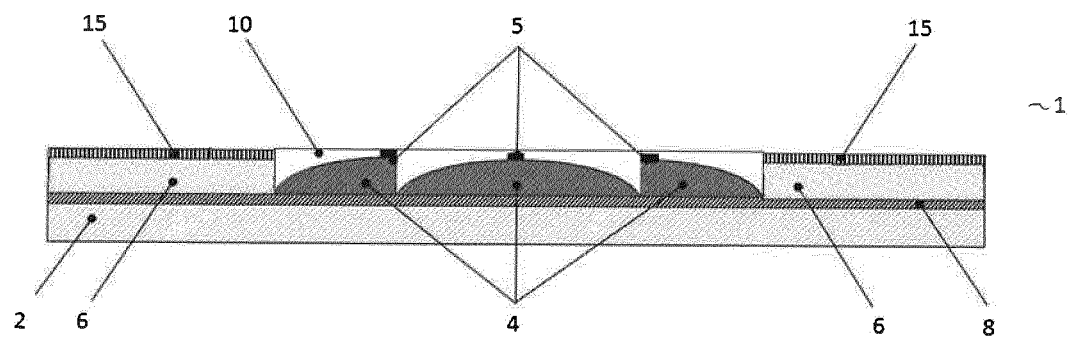
Figure 13E:
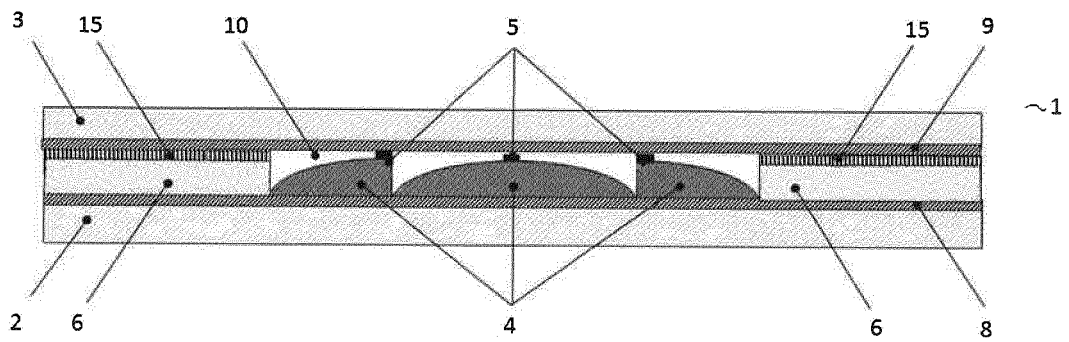

FIG. 12 illustrates an optical instrument containing a stack of optical devices of FIG. 4, when thermoformed, according to an embodiment.

FIG. 13(a) to (e) illustrates a preferred embodiment of a method of manufacturing an optical device.

TABLE 1

| feature - reference number overview | |
|---|---|
| Feature | Reference number |
| 1, 1' | Optical device |
| 2, 2' | First optical transparent |

TABLE 1-continued

| feature - reference number overview | |
|---|---|
| Feature | Reference number |
| | thermoplastic layer |
| 3, 3' | Second optical transparent thermoplastic layer |
| 4,4' | Diffractive optical element |
| 5,5' | Spacer |
| 6,6' | Border |
| 7,7' | Cavity |
| 8,8' | First optical transparent electrode |
| 9;9' | Second optical transparent |
| 10 | Liquid crystalline material |
| 11 | Alignment layer |
| 12 | Material composition (of 4, 5, 6) |
| 13 | Planarizing layer |
| 14 | Grooves |
| 15 | Adhesive |
| 16 | Notch |
| 17 | planarizing material (of layer 13, notch 16) |
| 18 | Layer of material 12 |
| 19 | channel through border (6) |
| 20 | conformal alignment layer |
| 21 | Additional spacers |

DETAILED DESCRIPTION OF ILLUSTRATED EMBODIMENTS

The present disclosure will be described with respect to particular embodiments and with reference to certain drawings but the disclosure is not limited thereto. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the disclosure. Equal reference numerals in different figures refer to equal or corresponding parts.

Furthermore, the terms first, second, third and the like in the description and in the claims, are used for distinguishing between similar elements and not necessarily for describing a sequential or chronological order. The terms are interchangeable under appropriate circumstances and the embodiments of the disclosure can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the disclosure described herein can operate in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting of only components A and B. It means that with respect to the present disclosure, the only relevant components of the device are A and B.

In a first aspect an optical device (1) is disclosed comprising a first optical transparent thermoplastic layer (2), a second optical transparent thermoplastic layer (3), and in between both thermoplastic layers (2,3), a diffractive optical element (4) adjacent to the first thermoplastic layer (2), a spacer (5) in between the diffractive optical element (4) and the second thermoplastic layer (3) and, a border (6) enclosing the diffractive optical element (4) thereby forming a cavity (7). The optical device (1) thus contains a sealed cavity (7) formed by the first thermoplastic layer (2), the second thermoplastic layer (3) and the border (6) positioned in between both thermoplastic layers (2,3). Inside the cavity area encircled by the border, the diffractive optical element (4) and the spacer (5) are present.

A thermoplastic, or thermosoftening plastic, is a plastic material, a polymer that becomes pliable or moldable above a specific temperature and solidifies upon cooling. Preferably these thermoplastic layers are made from polymers which are optically transparent: i.e. having between 5 and 100% light transmission efficiency in the visual spectrum e.g. 400-700 nm. Examples are polyethylene terephthalate, cellulose triacetate, transparent polyurethane polycarbonate, or thiourethane materials used for making eyeglasses such as Mitsui MR8. The films made of these materials may have thicknesses that vary between 5 and 1000 μm and typically withstand bending radii up to 3 mm.

The diffractive optical element may comprise a diffractive structure such as blazed gratings, Fresnel lenses, Fresnel axicons or other structures which induce a predetermined phase profile in the transmitted light. Preferably, the diffractive optical element is a Fresnel lens.

Figure 1A:
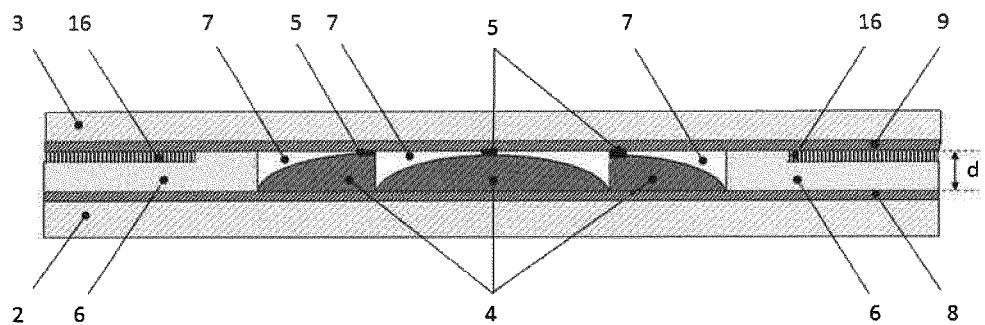
FIG. 1A-1D illustrate multiple embodiments of an optical device prior to thermoforming according to an embodiment.

An example of an implementation of such an optical device (1) is shown in FIG. 1A. As disclosed in embodiments below, the device shown in FIG. 1A further contains a pair of optical transparent electrodes (8, 9) at opposite sides of the cavity (7) positioned as to apply an electrical field over a liquid crystalline material (10) when present in the cavity (7). This device further comprises notches (16), formed in the border (6), containing an adhesive (15). The upper part of the device, with the second optical transparent thermoplastic layer (3) on which the second optical transparent electrode (9) is the formed, is hence attached to the border (6) by this adhesive (15).

When a liquid crystalline material (10) fills the cavity (7) and an adhesive (15) fills the notch (16), both materials are spaced apart by the sidewall of the border (6) adjacent to the diffractive optical element (4) as illustrated by FIG. 1A. This spacing prevents spill-over and/or cross-contamination when sealing the cavity (7) when providing the second optical transparent thermoplastic layer (3).

Figure 1B:
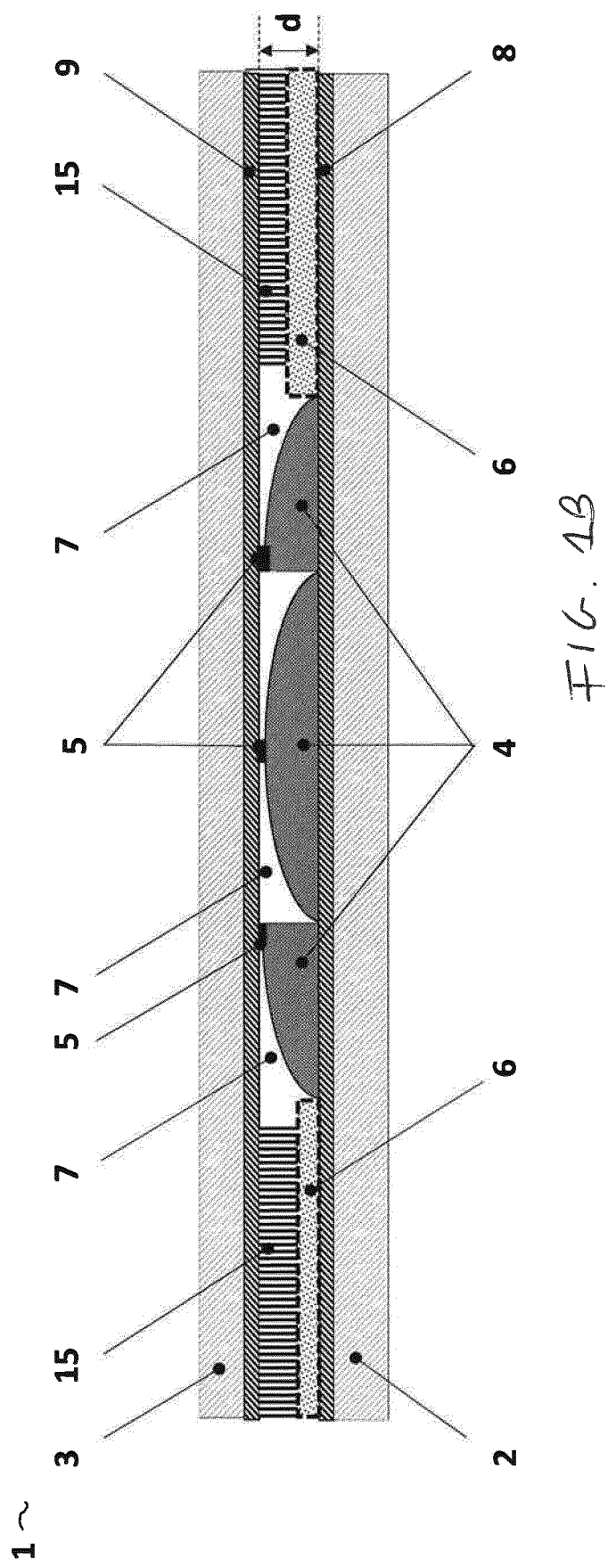
Figure 1C:
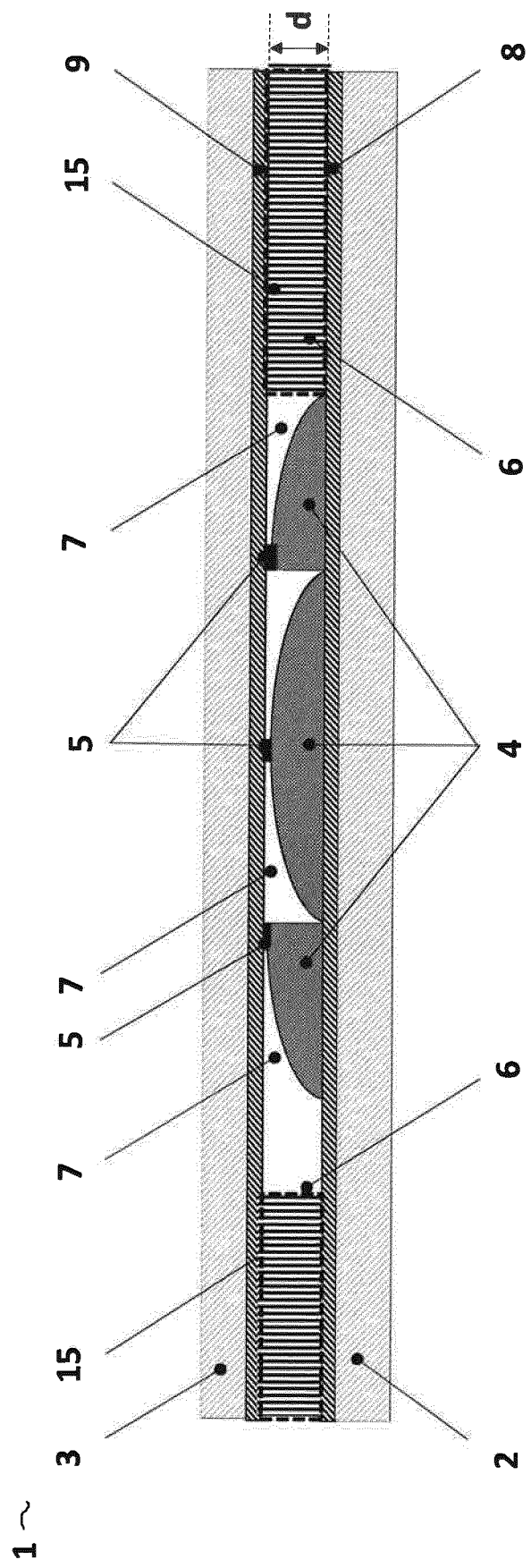
Figure 1D:
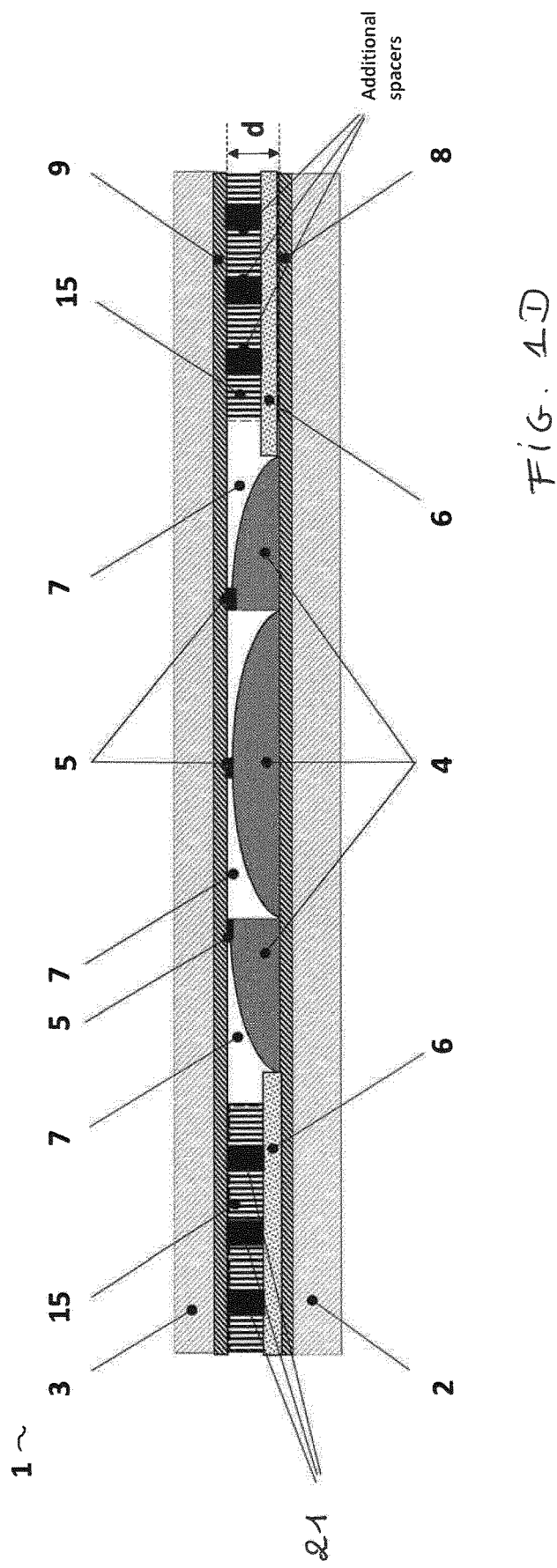

The use of a border with a notch has the advantage of constituting a clearly defined seal of the cavity, while indeed avoiding cross contamination between the adhesive and the liquid crystalline material. However, when applying the adhesive, the alignment accuracy of the deposition method has to be sufficiently high to achieve the desired effect. Low accuracy might result in bubble inclusion in the seal and more particularly in between the adhesive in the notch and the border. Such bubbles scatter incoming light and would lower the overall optical quality of the device. Therefore in some embodiments it is useful to not extend the border towards the second thermoplastic substrate, but extend the notch so it comes into contact with the cavity. When an adhesive is then applied the exact location of the inner edge of this adhesive towards the cavity is less important and bubble inclusion can be more easily avoided since the adhesive is in direct contact with the cavity. Examples of such embodiments are shown in FIGS. 1B, 1C and 1D. In these embodiments the adhesive might only partially fill the notch, as the position of the inner edge of the adhesive could be designed to be further away than the start of the border. In this way, overflow into the cavity due to poor deposition accuracy could be avoided. The border including the extending notch, the diffractive structure and the spacers can be made by a nanoimprinting process. The border, the diffractive structure and the spacers then have the same material composition.

In some embodiments, the border as a whole might be made out of an adhesive 15. Such embodiment is shown in FIG. 1C. In this figure, on the left hand side, the border is spaced somewhat away from the diffractive structure. This might be interesting to avoid interaction between the diffractive structure and the adhesive, which might be disadvantageous. On the right hand side of the figure, the adhesive 15 is shown directly adjacent the diffractive structure. When the techniques of applying the adhesive are reliable, such setup can be realized. The spacer and the diffractive structure preferably have the same material composition.

FIG. 1D shows a further embodiment wherein additional spacers 21 are provided in the border. When the border is designed to have a large width, and the adhesive is first applied in a liquid form, additional spacers in the border might also be advantageous to avoid overflow of the adhesive into the cavity. The height of the additional spacers does not need to be equal to the height of the spacers in the cavity. Both heights are preferably tuned as to have the same top level with respect to the first layer 2 as to keep the top substrate, which is the second optical transparent thermoplastic layer 3, straight. The additional spacers 21 are preferably formed by a nanoimprinting process. In this case, the spacer, the diffractive element, the border and the additional spacers preferably have the same material composition.

As discussed in the third aspect, a channel (19) can be present in the border (6), giving passage to the cavity (7) even after closure thereof by the second optical transparent thermoplastic layer (3). FIG. 9 shows a side view and a horizontal cross-section AA thereof of an optical device (1) containing such a channel (19). In one embodiment the channel (19) extends over the full width of the border (9).

Similar to described above, the notch in the border might extend until the channel, allowing the adhesive to come into contact with the liquid crystalline material that passes through the channel. The channel could only be present in the upper part of the border, for instance equal to the height of the notch. The channel might then be formed by not covering the whole border with an adhesive. In other embodiments the height of the channel could be larger, potentially extending over the full height of the border. Such embodiment is shown in FIG. 9C.

When the border is made of a single adhesive, such a channel could also be present by not covering the whole border area when applying the adhesive.

The fluid material filling the cavity (7) can be a liquid crystalline material, a variable refractive index polymer material, variable dye, an electro chromic electrolyte, or a resin. Preferably the index of refraction of the liquid crystalline material (10) is matched with the index of refraction of the diffractive optical element (4), the border (6) and the adhesive (15) at least for one of the states of the liquid crystalline material (10). For instance, the ordinary index of the well-known liquid crystal E7 is equal to the UV glue NOA74.

Preferably the bottom substrate containing the first optical transparent thermoplastic layer (2), and the first optical transparent electrode (8), and the upper substrate containing the second optical transparent thermoplastic layer (3), and the second optical transparent electrode (9), are at a fixed distance (d) set by a stack of a spacer (5) on top of the diffractive optical element (4) and, in parallel, by the border (6). Thus both structures (5-4, 6) are positioned in between both substrates as illustrated by FIG. 1. This height can be between 10 nanometer (nm) and 100 micrometer (μm), typically between 50 nm and 50 μm.

In a preferred embodiment the border (6), the spacer (5) and the diffractive optical element (4) have the same material composition (12). For example, the spacer (5), the diffractive optical element (4) and the border (6) can be made from a high-refractive-index monomer such as bisphenol fluorine diacrylate or high refractive index UV-glues such as NOA 1625 or NOA 164.

As disclosed below, the border (6), the spacer (5) and the diffractive optical element (4) can be formed using nanoimprint technology from the same layer (18), having this material composition (12), present on the bottom substrate.

Figure 3:
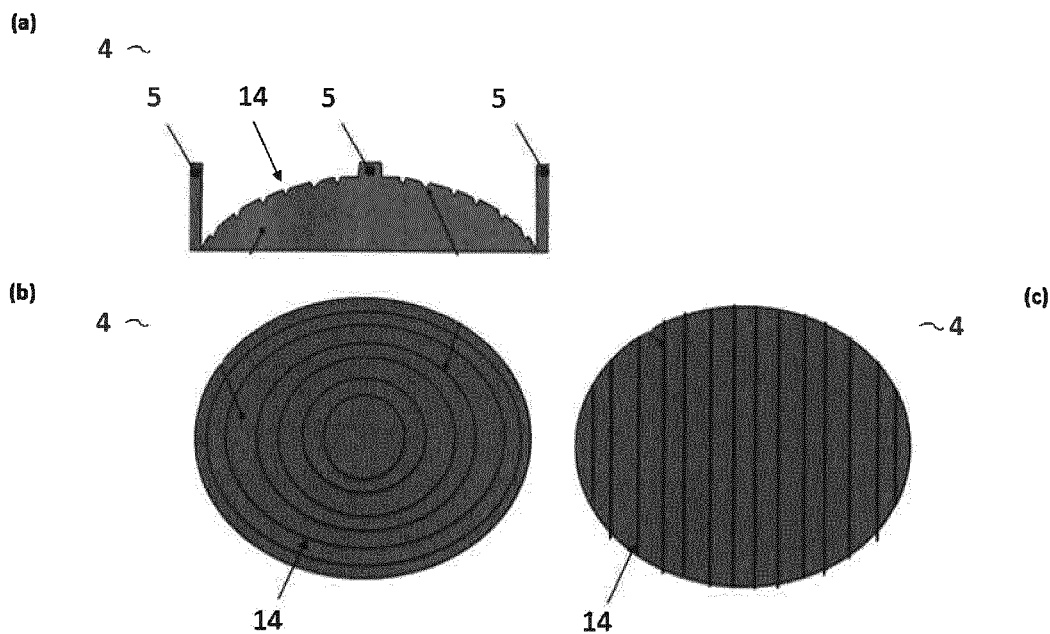
FIG. 3 illustrates an diffractive optical element with grooved surface according to an embodiment: (a) cross-section, (b) top view of (a) with circular grooves, (c) top view of (a) with parallel grooves.

Preferably, the surface of the diffractive optical element (4), which surface is oriented towards the second thermoplastic layer (3) contains submicron grooves (14) configured as an alignment layer (11) for a liquid crystalline material (10). During operation of the device (1) these grooves assist in orienting the liquid crystals present in the cavity (7). Preferably another alignment layer (11) is also present at the side of the cavity (7) adjacent to the second optical transparent electrode (3) thereby facing the grooved surface. FIG. 3(a) is a cross-sectional view showing how these grooves (14) are present in the three-dimensional surface of the diffractive optical element (4). FIG. 3(b) gives a top view of this surface when the grooves have a circular pattern, while FIG. 3(c) gives a top view of this surface when the grooves have a parallel pattern. In FIG. 3 one also notice that in this embodiment the spacer (5) on top of the diffractive optical element (4) and the diffractive optical element (4) are formed from the same material as discussed in the paragraphs above.

These grooves can be created when forming the diffractive optical element (4) by nanoimprint as discussed in the previous paragraphs. The mold used in the nanoimprint process contains not only the negative shape of the border (6), the spacer (5) and the diffractive optical element (4), but its inner surface, at least at the location of the shape of diffractive optical element (4), contains grooves in e.g. a circular or rectangular pattern. This approach allows forming these 4 features (4, 5, 6, 14) in an integral way. Y. J. Liu et al discloses forming such alignment patterns using nanoimprint technology in 'Nanoimprinted ultrafine line and space nano-gratings for liquid crystal alignment', as does R. Lin et al. in 'Molecular-Scale Soft Imprint Lithography for Alignment'.

The alignment properties of the liquid crystalline material (10) are not only determined by the geometry of grooves (14) themselves, but also by the material constituting the diffractive optical element (4) in which the grooves are formed. If another material is used for the same configuration of the grooves, an additional conformal alignment layer (20) (not shown) can be formed overlying these grooves (14) to provide different material alignment properties. For instance, a homeotropic alignment layer might be coated, overlaying at least some of the grooves if the material of the diffractive optical element aligns the liquid crystal molecules in a planar way. This conformal alignment layer can cover the complete grooved surface of the diffractive optical element (4). Alternatively only part of this grooved surface can be covered with this additional conformal alignment layer allowing to exploit the difference in material alignment properties between the additional conformal alignment layer (20) (not shown)) and the diffractive optical element (4).

A layer (17) of a planarizing material can be present inside the cavity (7) on top of the diffractive optical element (4) as illustrated by FIG. 4 and FIG. 10. FIG. 4 shows herein the device according to EP3255479A1. FIG. 10 shows the device in accordance with the invention, wherein the adhesive (15) is in direct contact with the cavity (7).

Similar to the implementation illustrated by FIG. 3, an alignment layer can be present at the bottom of the cavity (7), for instance embodied as grooves (14) formed in the surface of the planarizing layer (17), which surface is oriented towards the second thermoplastic layer (3). During operation of the device (1) these grooves assist in orienting the liquid crystals present in the cavity (7). Preferably another alignment layer (not shown) is also present at the side of the cavity (7) adjacent to the second optical transparent electrode (3), thereby facing the grooved surface.

The alignment properties of the liquid crystalline material (10) are not only determined by the geometry of grooves (14) themselves, but also by the material constituting the planarizing layer (17) in which the grooves are formed. If another material is used for the same configuration of the grooves, an additional conformal alignment layer (not shown) can be formed overlying these grooves (14) to provide different material alignment properties. For instance, a homeotropic alignment layer might be coated, overlaying at least some of the grooves if the material of the diffractive optical element aligns the liquid crystal molecules in a planar way. This conformal alignment layer can cover the complete grooved surface of the planarizing layer (17). Alternatively only part of this grooved surface can be covered with this additional conformal alignment layer allowing to exploit the difference in material alignment properties between the additional conformal alignment layer (not shown) and the planarizing layer (17)

The materials of respectively the diffractive optical element (4) and the planarization layer (17), at least at their interface, can have the same refractive index Furthermore, the dielectric constant at low frequency electric fields (e.g. 1 Hz-10 kHz) of the these materials (12,17) may differ.

This planarizing material (17) can also be used to form spacers (5) and any additional spacers (such as shown in FIG. 1D), with a top defining the height of the border (6). It may further be part of the border. If a notch is present, it is formed in this planarizing material (17) as illustrated in FIG. 4. Adhesive (15) is applied on top of the border (6, 17). The height of the border (6) and planarizing layer thereon (17) may be matched such that the adhesive (15) can be applied in a standardized process, using commercially available equipment, and still the total height meets the specifications. Due to their different manufacturing processes, the adhesive (15) can be distinguished from the border (6) and any additional spacers also in a resulting optical device.

In the implementation as illustrated by FIG. 4 and FIG. 10, the bottom substrate containing the first optical transparent thermoplastic layer (2), and the first optical transparent electrode (8), and the top substrate containing the second optical transparent thermoplastic layer (3), and the second optical transparent electrode (9), are at a fixed distance (d) set by the stack of a spacer (5) on top of the planarizing layer (17) covering the diffractive optical element (4) and, in parallel, by the border (6) comprising adhesive (15) and any additional spacers or upper parts of the border (6) as may be present. These structures (4-5-17, 6, 17, 15) being positioned in between both substrates as illustrated by FIG. 4 and FIG. 10. This height can be between 10 nanometer (nm) and 100 micrometer (μm), typically between 50 nm and 50 μm.

It is deemed beneficial that both the diffractive optical element (4) and the cavity (7) filled with liquid crystalline material are present between the first and the second electrode (8,9). Herewith, the electrodes (8,9) have a planar shape, avoiding any risk of cracking of electrode layers on the diffractive optical element (4), such as a Fresnel lens with widely varying surface orientations. Moreover, the distance between the electrodes (8,9) is not dependent on any tolerance in the nanoimprint process. Furthermore, it is not necessarily to apply a separate barrier layer on the Fresnel lens, such as SiO2, as is required in the prior art EP2530511A1 to support the electrode layer.

As disclosed below, the spacer (5), and if present the notch (16), can be formed in the planarizing layer (17) overlying the bottom substrate using nanoimprint technology. When nanoimprinting the spacer (5) the cavity (7) is formed. Again, when a liquid crystalline material (10) fills the cavity (7) and an adhesive (15) fills the notch (16), both materials are spaced apart by the sidewall of the border (7) adjacent to the diffractive optical element (7) as illustrated by FIG. 4. This spacing prevents spill-over and/or cross-contamination when sealing the cavity (7) when providing the second optical transparent thermoplastic layer (3).

An optical device (1) as illustrated in FIG. 1 or FIG. 3 is a planar device. If desired, a curved version of it can be obtained by subjecting the optical device (1) to a thermo-forming process as will be discussed in the third aspect of this disclosure. Preferably the optical device (1) is spherically curved. A predetermined curvature of the thermoplastic layers (2,3) and hence of the optical device (1) can then be obtained as illustrated by FIG. 2. Such a curved optical device (1) can be used inter alia as lens insert, as will be discussed in the second aspect of this disclosure.

As already shown in FIG. 1A-D, FIG. 2 and FIG. 4 and FIG. 10, the optical device (1) further can contain a pair of optical transparent electrodes (8,9) at opposite sides of the cavity (7). According to the invention, a first optical transparent electrode (8) is present adjacent to (i.e. on) the first optical transparent thermoplastic layer (2), while a second optical transparent electrode (9) is present adjacent to (i.e. on) the second optical transparent thermoplastic layer (3), whereby the diffractive optical element (4) is in between both optical transparent electrodes (8,9).

The second optical transparent electrode (9) is typically on the second optical transparent thermoplastic layer (3) at the side of the cavity (7) as illustrated by in FIG. 1A-D, FIG. 2 and FIG. 4. The first optical transparent electrode (8) can be present in-between the diffractive optical element (4) and the first optical transparent thermoplastic layer (2) as illustrated in FIG. 1A-D, FIG. 2 and FIG. 4 and FIG. 10.

If the first optical transparent electrode (8) is located in-between the diffractive optical element (4) and the first optical transparent thermoplastic layer (2) as illustrated in FIG. 1A, FIG. 2 and FIG. 4, a planarizing layer (17) is to be used—if any—having a dielectric constant that differs from the dielectric constant of the diffractive optical element (4).

The optical transparent electrodes can be made of materials such as Indium Tin Oxide (ITO), ClearOhm® silver nanowires or AGFA Orgacon inks. Because of the brittleness of ITO, less rigid and more flexible materials can be used such as PEDOT:PSS, graphene, carbon nanotubes or silver nanowires. The optical transparent electrodes (8, 9) can be patterned to individually address different zones of the diffractive optical element (4). These electrodes can also be patterned to reduce the overall capacity, e.g. by only having electrodes within the area of the diffractive optical element (4) or to separate the electrode within this area from electrode within the area of the border (6).

In a third aspect of this disclosure, optical devices (1) as disclosed in the previous aspect, are used in optical instruments. When inserted in an optical instrument, the optical device (1) is configured to tune the phase profile of the light towards the eye.

Such an optical instrument can be a lens, where the optical device is used as a lens insert. When considering ophthalmic applications, the lens might be an eyeglass lens, a contact lens or an intraocular lens. Since both eyeglass lenses and contact lenses generally have a meniscus shape, the optical device can be more easily integrated in the lens, when the optical device (1) is also curved with a curvature substantially the same as the curvature of the lens in which it needs to be embedded. Typically, the optical device will then be curved in two orthogonal directions. For intraocular lenses, a planar or a curved optical device can be embedded.

Such optical instruments can contain more than one optical device (1). These optical devices (1,1') can be stacked. By stacking multiple optical devices (1,1'), the electro-optical properties of the single optical devices can be combined. For instance, two devices filled with nematic liquid crystal but with an orthogonal alignment can lead to a polarization independent tunable lens.

Figure 5:
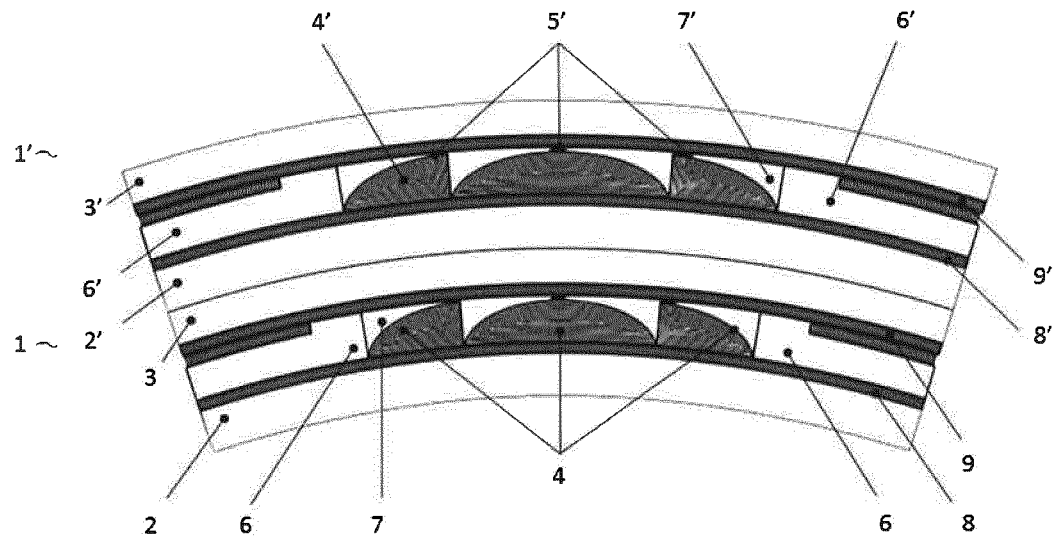
FIG. 5 illustrates an optical instrument containing a stack of optical devices of FIG. 2 according to an embodiment.
Figure 6:
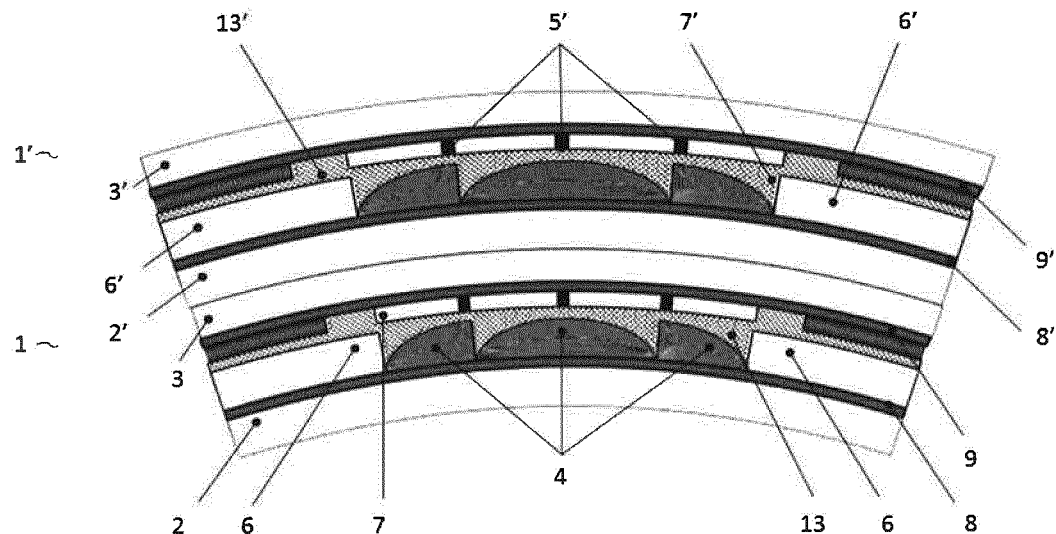
FIG. 6 illustrates an optical instrument containing a stack of optical devices of FIG. 4, when thermoformed, according to an embodiment.

In the implementations illustrated by FIGS. 5 & 11 and FIGS. 6 & 12, optical devices (1,1') respectively without and with planarizing layer (13, 13') are stacked. FIGS. 5 and 6 show herein stacking of the devices according to EP3255479. FIGS. 11 and 12 show stacking of the devices in accordance with the invention. FIG. 11 illustrates the same embodiment as in FIG. 5, the same reference numerals referring to the same elements. For clarity, the adhesive (15) is illustrated as being in direct contact with the cavity (7) in accordance with the present invention. FIG. 12 illustrates the same embodiment as in FIG. 6, the same reference numerals referring to the same elements. For clarity, the adhesive (15) is illustrated as being in direct contact with the cavity (7) in accordance with the present invention.

Figure 7A:
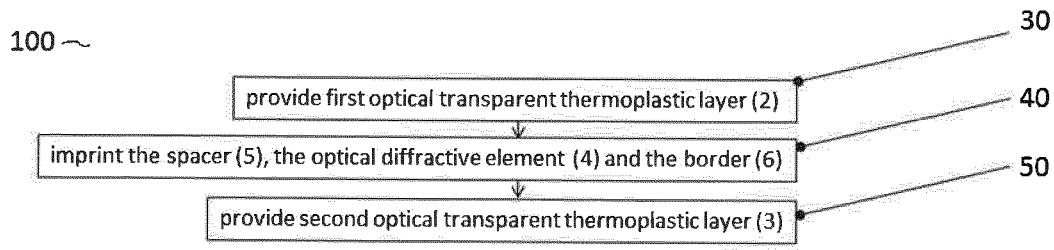

The invention also relates to a method for manufacturing optical devices of the type shown in the figures. Such methods (100) of manufacturing the optical device (1), comprises (30) providing a first optical transparent thermoplastic layer (2), (40) forming by nanoimprint on the first optical transparent thermoplastic layer (2), a spacer (5), an optical diffractive element (4) and a border (6) enclosing the optical diffractive element (4), and, (50) providing a second optical transparent thermoplastic layer (3) thereby forming a cavity (7) containing the spacer (5) and the optical diffractive element (4) whereby the spacer (5) is in between the optical diffractive element (4) and the second optical transparent thermoplastic layer (2). This method is illustrated by FIG. 7(a).

Nanoimprint technology is a simpler, lower-cost and high-throughput patterning technology compared to lithographic patterning used in semiconductor and flat panel manufacturing technology. As disclosed inter alia in 'A review of roll-to-roll nanoimprint lithography', by Kooy et al in Nanoscale Research Letters 2014, hereby incorporated by reference, nanoimprint lithography involves the use of a prefabricated mold containing an inverse of the desired pattern. This mold is pressed into a polymer-coated substrate whereby the pattern is replicated into the polymer by mechanical deformation thereof. After deformation the pattern is fixed using a thermal process on the deformed polymer or by exposing the deformed polymer to UV-light resulting in a hardening of the nanoimprinted pattern. Thereafter the mold is removed. The inverse pattern can correspond to a single structure to be formed. Forming an array of structures in the polymer then requires repeating the nanoimprint process as many times as the number of structures needed. The throughput can be increased if the mold contains an array of the inverse pattern, whereby during a single nanoimprint the desired number of structures is simultaneously formed in the same polymer.

Figure 7B:
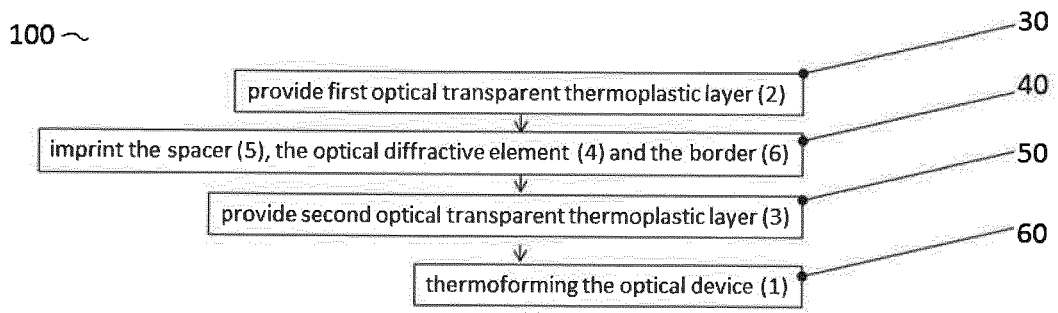
Figure 7C:
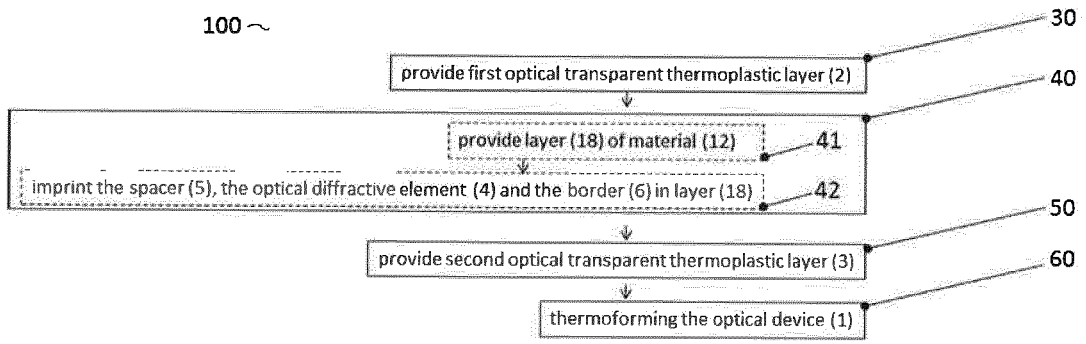
Figure 7D:
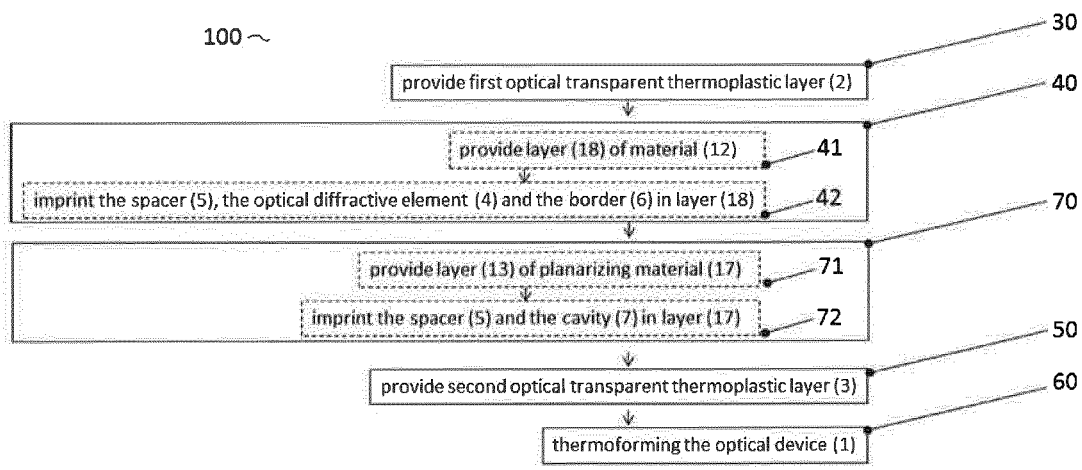

Implementations of this method (100) are further illustrated in FIG. 7(b) to (d). FIG. 7(b) illustrates the implementation whereby, the spacer (5), the optical diffractive element (4) and the border (6) enclosing the optical diffractive element (4) are formed by nanoimprint technology (40). As illustrated by FIG. 7(c), in such implementation a layer (18) of a material composition (12) can provide (41) on the first optical transparent layer (2), or, if present on the first optical transparent electrode (8). In this layer (18) the spacer (5), the optical diffractive element (4) and the border (6) enclosing the optical diffractive element (4) are (42) nanoimprinted whereby all these elements have the same material composition. The spacer (5) and the optical diffractive element (4) are stacked on each other thereby maintaining a controlled distance (d) between both thermoplastic layers (2,3). FIG. 7(d) illustrates the implementation with a first and a second nanoimprinting stage (71, 72). In the first stage (71) the spacer (5), the optical diffractive element (4) and the border (6) are provided by nanoimprinting. In the second stage, a planarizing layer (17) is provided. In this planarizing layer (17) the spacer (5) and hence the cavity (7) is formed by another nanoimprint process (72).

As discussed hereinabove, the bottom surface of the cavity (7), whether it is the surface of the diffractive optical element (4) or the surface the planarizing layer (13) covering this optical element (1), can be grooved during the respective nanoimprint process (32, 62) thereby forming an alignment layer (11) for a liquid crystalline material (10).

The methods (100) discussed in the foregoing paragraphs can further comprise forming a first optical transparent electrode (8) adjacent to the first optical transparent thermoplastic layer (2), forming a second optical transparent electrode (9) adjacent to the second optical transparent thermoplastic layer (3), whereby at least the cavity (7) is in between both optical transparent electrodes (8).

The bottom substrate comprising on the first optical transparent thermoplastic layer (2), the spacer (5), the optical diffractive element (4) and the border (6), optionally the notch (16) in the border (6) is attached to top substrate comprising the second optical transparent thermoplastic layer (3), by providing, prior to providing the second optical transparent thermoplastic layer (3), an adhesive (15).

Although in the methods discussed above, the manufacturing of a single optical device (1) was disclosed, multiple optical devices (1,1') can be manufactured using semiconductor or flat panel display manufacturing techniques. Instead of forming, e.g. by nanoimprinting in a layer (12), a single configuration of a spacer (5) and an optical diffractive element (4), enclosed by a border (6), one can form an array of such combinations, either in parallel or sequentially, resulting in an array of: a spacer (5) and an optical diffractive element (4), enclosed by a border (6). One or multiple devices can be extracted from the array by e.g. punching or laser cutting.

As illustrated by FIG. 7(b), after providing the second optical transparent thermoplastic layer (3), a planar optical device (1) is obtained as illustrated by FIG. 1A or FIG. 4 or FIG. 10. This planar optical device (1) can then be subjected to a thermoforming process resulting in a curved optical device (1) as illustrated by FIG. 2, whereby each optical transparent thermoplastic layer (2,3) has a predetermined curvature. During the thermoforming process, the optical device (1) is placed in a mold and heated until at least the glass transition temperature Tg of the optical transparent thermoplastic layers (2,3) is reached whereby the mechanical force applied let the thermoplastic layers assume the shape of the mold. The mold is then closed and cooled down below this glass transition temperature Tg to fix the shape of the deformed thermoplastic layers. Then the optical device (1), now curved, is released from the mold. Alternatively, the optical device can be clamped at its sides onto a single sided mold whilst heating. During the thermoforming process, the optical device can then be brought into the desired shape be creating a pressure difference over the optical device (1). Such a pressure difference can be obtained by creating a vacuum in between the optical device or the mold, or by creating a higher pressure atmosphere above the device than in between the device and the mold.

One can also stack optical devices (1, 1') on top of each-other. In one implementation two optical devices (1, 1') are manufactured, as discussed in the foregoing paragraphs of this third aspect. Both optical devices (1, 1') are stacked. This stack of optical devices (1,1') is then subjected to a thermoforming process resulting in a curved optical device (1) as illustrated by FIG. 5 or FIG. 6, whereby each optical transparent thermoplastic layer (2,3) has a predetermined curvature. In another implementation such stack of optical devices (1,1') is formed by manufacturing one optical device (1') on top of another optical device (1). In this implementation a first optical device (1) is manufactured as discussed in the foregoing paragraphs of this third aspect. On top of this optical device (1) a second optical device (1') is manufactured as discussed in the foregoing paragraphs of this third aspect. Instead of providing a first optical transparent thermoplastic layer (2') for this second optical device (1'), one can use the second optical transparent thermoplastic layer (3) of the first optical device (1) as the first optical transparent thermoplastic layer (2') of the second optical device (1'). Once the second optical device (1') is manufactured, it is stacked on the first optical device (1). Then the stack of two optical devices (1, 1') is thermoformed, thereby giving each optical transparent thermoplastic layer (2,3, 2', 3') a predetermined curvature.

In FIG. 8(a) to (d), an implementation of this method is shown resulting in the optical device (1) illustrated by FIG. 1A. Preferably the optical device is manufactured in a semiconductor or flat panel display fab allowing to exploit the manufacturing process enabling mass scale production of the optical device (1) comparable to the manufacturing of semiconductor circuits or flat displays. FIGS. 13(a)-13(e) illustrate the same method as in FIG. 8, but for the device of FIGS. 1B and 1D (with additional spacers 21). In order to not obscure the present invention, the steps are presented with reference to FIG. 8(a) to (d). For clarity, the adhesive (15) is illustrated as being in direct contact with the cavity (7) in accordance with the present invention.

Figure 8A:
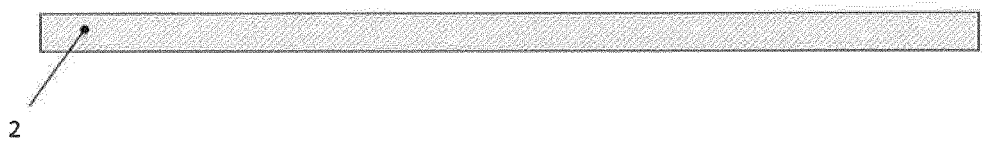

As a first step illustrated by FIG. 8(a), the first optical transparent thermoplastic layer (2) is formed on a temporary carrier (not shown). Most semiconductor or flat panel process equipment is configured to handle rigid panels or wafers having a diameter of 10 cm or more. Using such a temporary mechanical carrier, on which the different elements of the optical device (1) are formed, allows using this type of equipment which then results in a cost-efficient and reliable manufacturing process. It also ensures that the optical transparent thermoplastic layer or film (2) remains flat during processing of the optical device (1), thereby reducing the total thickness variation over the array of optical devices (1) manufactured. Reduced thickness variation is important for subsequent process steps, such as e.g., lithography and one drop fill process for providing liquid crystalline material (10) when filling the cavity (7) without spill-over. The adhesive (15) is again to be provided at a height that does not create variations in thickness. The use of the spacers (5) and preferably also additional spacers (21, shown in FIG. 1D) is deemed beneficial so as to create a cavity during manufacturing with a planar top side.

Thanks to the size of the temporary mechanical carrier, multiple optical devices (1) can be manufactured on a single carrier enabling large throughput and hence lower cost per optical device (1).

The first optical transparent thermoplastic film (2) can be formed on the carrier by lamination. Typically the laminate film (2) is between 5 um and 1000 um thick. Alternatively, one may deposit a thermoplastic material in liquid form onto the carrier. The liquid material can then be either UV or thermally cured, thereby forming the first optical transparent thermoplastic film (2). Either way, a temporary adhesive may be needed to attach the first optical transparent thermoplastic film (2) to the carrier, allowing releasing the optical device (1) from the temporary carrier after completing of the processing. Temporary carrier solutions are available from companies such as TOK, Brewer Science, 3M, Nitto etc. In some cases the film (2) is fixated by applying a vacuum in between the film and the carrier.

Figure 8B:
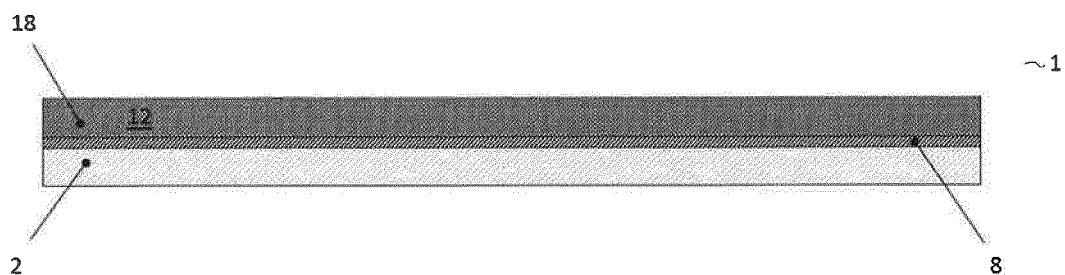
Figure 8C:
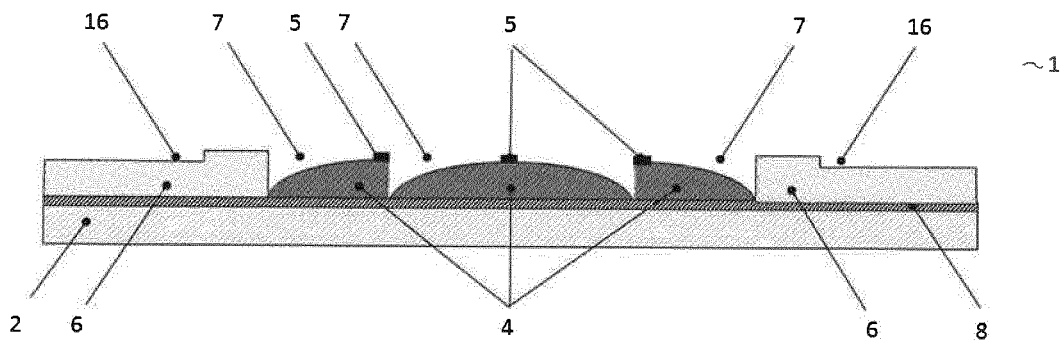

On the first optical transparent thermoplastic layer (2), a transparent conductive film is formed to manufacture the first optical transparent electrode (8) as shown in FIG. 8(b). On the first optical transparent electrode (8), the border (6), the diffractive optical element (4) and a spacer (5) is formed. As illustrated by FIG. 8(b) a layer (18) of a material composition (12) is formed on the first optical transparent electrode (8). Using nanoimprint technology, the border (6), the diffractive optical element (4) and a spacer (5) are formed in this layer (18) as shown in FIG. 8(c), thereby creating a cavity (7) at the location of the diffractive optical element (4). This layer (18) can be a single layer or a stack of layers, whereby each layer can have a different material composition.

An alignment layer (not shown) is formed at the bottom of the cavity (7) to control the orientation of the liquid crystalline material (10) when present in the cavity (7). This alignment layer can be created by forming submicron grooves in the surface of the diffractive optical structure (4) during the nanoimprint process. FIG. 3 illustrates a circular and a rectangular pattern of grooves in the top surface of the diffractive optical structure (4).

Figure 8D:
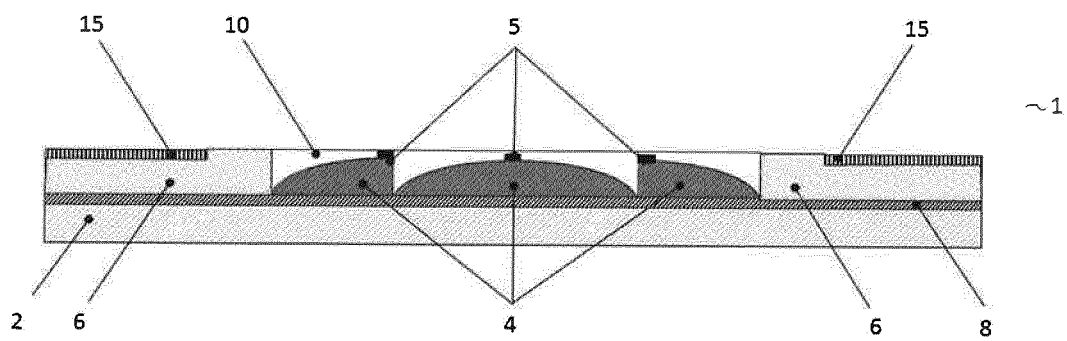
Figure 8E:
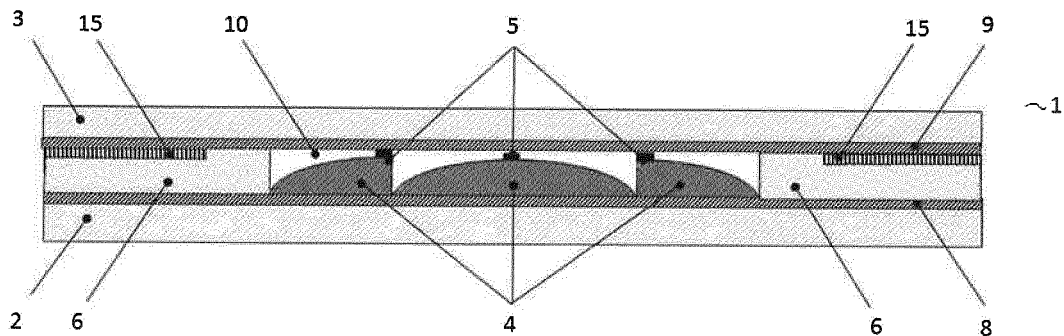

The cavity (7) may be filled and completed by a One Drop Fill process which starts by dispensing liquid crystalline material (10) in a micro-dispensed volume matching the volume of the cavity (7). Subsequently, the adhesive (15) is dispensed on the border (6), preferably by using a dispensing or screen printing process as illustrated by FIG. 8(d). Typically the adhesive (15) can be a transparent UV-glue, a transparent thermal glue or a combination of both. The border minimizes cross-contamination between the adhesive part, i.e. the notch, and the electro-active part, i.e. the cavity (7), while creating a clear line between both parts. The adhesive (15) could also be dispensed before filling the cavity (7) with the liquid crystalline material (10).

Whereas the above steps describes the formation of the bottom part or substrate of the optical device (1), the upper part or substrate of the optical device (1) is formed by forming the second optical transparent thermoplastic layer (3) on another temporary carrier (not shown). The second optical transparent thermoplastic film (3) can be formed on this carrier by lamination. Typically the laminate film (3) is between 5 um and 1000 um thick. Alternatively, one may deposit a thermoplastic material in liquid form onto the carrier. The liquid material can then be either UV or thermally cured, thereby forming the first optical transparent thermoplastic film (3). Either way, a temporary adhesive may be needed to attach the second optical transparent thermoplastic film (3) to the carrier, allowing releasing the optical device (1) from the temporary carrier after completing of the processing. Temporary carrier solutions are available from companies such as TOK, BrewerScience, 3M, Nitto, etc. In some cases the film (2) is fixated by applying a vacuum in between the film and the carrier.

On the second optical transparent thermoplastic layer (3), a transparent conductive film is formed to manufacture the second optical transparent electrode (9). This conductive film can be ITO. Because of the brittleness of ITO, less rigid and more flexible materials can be used such as PEDOT:PSS, graphene, carbon nanotubes or silver nanowires. On this second optical transparent electrode (9) another alignment layer (11) is formed to control the orientation of the liquid crystalline material (10) when present in the cavity (7).

To complete the One Drop Fill process as described above, this upper substrate is laminated on the bottom substrate using a vacuum lamination step as illustrated by FIG. 8(d). The glue layer (15) is cured through e.g. an UV step and/or a thermal step. This way ensures a fully closed cavity (7) is obtained with no interruption in the seal.

After laminating both substrates, the temporary carriers can be removed by debonding. The thus formed array of optical devices (1) is diced into individual planar optical devices (1) as shown in FIG. 1. This planar optical device (1) can then be curved by thermoforming as discussed above.

An alternative method for filling the cavity (7) with the liquid crystalline material (10) is to create during nanoimprint a channel (19) at least in the upper part of the border (6). FIG. 9 illustrates an optical device (1) having a channel (19) not only in the upper part but extending over the full height h of the border. The liquid crystalline material (10) is provided after the cavity (7) is closed by applying the second optical transparent thermoplastic layer (3). The closed cavity (7) of the individual optical devices (1) can then be filed with the liquid crystalline material (10).

Furthermore, the array of the optical devices (1) can also be thermoformed simultaneously by any of the above mentioned techniques with an appropriate mold. After thermoforming, the array is diced yielding the individual optical devices (1, 1').

The invention claimed is:

1. A method of manufacturing an optical device comprising a pair of a first and second optically transparent electrodes at opposite sides of a cavity filled with a liquid crystalline material, the cavity being laterally enclosed by a border, wherein the first and second optically transparent electrodes are respectively present on a first and a second optically transparent layer, wherein the first optically transparent electrode is positioned in between the first optically transparent layer and a diffractive optical element, wherein at least one spacer is present in the cavity between the diffractive optical element and the second optically transparent layer, the method comprising:
  providing the first optically transparent layer;
  forming the first optically transparent electrode on the first optically transparent layer;
  forming by nanoimprint on the first optically transparent electrode, the diffractive optical element and the at least one spacer on top of the diffractive optical element, wherein the diffractive optical element is arranged at an inside of the border, the border therewith enclosing the diffractive optical element;
  applying an adhesive so as to constitute at least an upper part of the border, wherein an inner edge of the adhesive is in direct contact with the cavity;
  providing the second optically transparent layer such that the second optically transparent layer closes the cavity, and wherein the second optically transparent layer on which the second optically transparent electrode is formed, is attached to the adhesive;
  filling the cavity with the liquid crystalline material; and
  sealing the cavity.

2. The method as claimed in claim 1, further comprising:
  forming by nanoimprint on the first optically transparent layer the diffractive optical element, the at least one spacer so that a first substrate containing the first optically transparent layer and the first optically transparent electrode, and a second substrate containing the second optically transparent layer and the second optically transparent electrode, are at a fixed distance set by a stack of the at least one spacer on top of the diffractive optical element.

3. The method as claimed in claim 1, wherein:
  the method further comprises curving the optical device by a thermoforming process, or
  each of the first and second optically transparent layer is an optically transparent thermoplastic layer.

4. The method as claimed in claim 1, wherein forming by nanoimprint comprises applying a layer of a material composition on the first optically transparent layer, and nanoimprinting the at least one spacer, the diffractive optical element and a bottom part of the border in the layer.

5. The method of claim 4, wherein:
  submicron grooves are formed in a surface of the diffractive optical element during the forming by nanoimprint, and
  one or more of the following applies:
    the submicron grooves are configured as an alignment layer for the liquid crystalline material, or
    a conformal alignment layer is deposited so as to cover at least part of the submicron grooves.

6. The method as claimed in claim 1, wherein a bottom part of the border comprises additional spacers.

7. The method of claim 6, wherein the at least one spacer and the additional spacers each have a height, which heights are tuned to have a same top level with respect to the first optically transparent layer.

8. The method as claimed in claim 1, wherein the liquid crystalline material is provided to the cavity before the second optically transparent layer closes the cavity.

9. The method as claimed in claim 8, wherein use is made of a One Drop fill process, comprising:
  dispensing a volume of the liquid crystalline material into the cavity, the dispensed volume matching a volume of the cavity;
  dispensing the adhesive; and
  providing the second optically transparent layer by a vacuum lamination process.

10. The method as claimed in claim 1, wherein a channel is formed in at least an upper part of the border and extending through the border into the cavity, and wherein the liquid crystalline material is provided after that the cavity is closed with the second optically transparent layer.

11. The method as claimed in claim 10, wherein the channel is formed when nanoimprinting the border.

12. The method as claimed in claim 1, further comprising:
  manufacturing a first optical device and a second optical device, and
  stacking the first optical device and the second optical device prior to any thermoforming.

13. The method of claim 1, wherein:
  the diffractive optical element comprises a diffractive structure, and
  the diffractive structure comprises a blazed grating, a Fresnel lens, or a Fresnel axicon.

14. The method of claim 1, further comprising:
  forming, by nanoimprint, a bottom part of the border on the first optically transparent electrode.

15. An optical device comprising a pair of a first and second optically transparent electrodes at opposite sides of a sealed cavity filled with liquid crystalline material, the sealed cavity being laterally enclosed by a border, wherein the first and second optically transparent electrodes are respectively present on a first and a second optically transparent layer, wherein the first optically transparent electrode is positioned in between the first optically transparent layer and a diffractive optical element, wherein at least one spacer is present on top of the diffractive optical element and in the sealed cavity between the diffractive optical element and the second optically transparent layer, wherein the diffractive optical element is laterally enclosed by the border,
  wherein:
    the diffractive optical element, the at least one spacer and a bottom part of the border are present in a layer that is patterned by nanoimprinting and is present on the first optically transparent electrode, and
    an upper part of the border comprises an adhesive that is in direct contact with the sealed cavity, wherein
    the second optically transparent layer closes the sealed cavity, and
    the second optically transparent layer on which the second optically transparent electrode is formed, is attached to the adhesive.

16. The optical device as claimed in claim 15, further comprising:
  a first substrate containing the first optical transparent layer and the first optical transparent electrode, and
  a second substrate containing the second optical transparent layer and the second optical transparent electrode,
  wherein the first and second substrate are at a fixed distance set by a stack of the at least one spacer on top of a diffractive structure on the diffractive optical element.

17. The optical device as claimed in claim 15, wherein the bottom part of the spacer comprises additional spacers, wherein the at least one spacer and the additional spacers each have a height, which heights are tuned to have a same top level with respect to the first optically transparent layer.

18. The optical device as claimed in claim 15, wherein each of the first and second optically transparent layer is an optically transparent thermoplastic layer.

19. The optical device as claimed in claim 15, wherein the optical device is thermoformed and provided with a predetermined curvature.

20. A stack of a first and a second optical device as claimed in claim 15.

21. The stack as claimed in claim 20, wherein the stack is thermoformed and provided with a predetermined curvature.

22. The optical device of claim 15, wherein:
the diffractive optical element comprises a diffractive structure, and
the diffractive structure comprises a blazed grating, a Fresnel lens, or a Fresnel axicon.

* * * * *